United States Patent [19]
Yoshitake et al.

[11] 3,753,342
[45] Aug. 21, 1973

[54] APPARATUS FOR WINDING UP WIRE, STRAND, CABLE OR THE LIKE

[75] Inventors: Tatumi Yoshitake; Masami Azetu, Ohita, Japan

[73] Assignee: Nishinippon Electric-Wire & Cable Co., Ltd., Ohita-ken, Japan

[22] Filed: Dec. 14, 1971

[21] Appl. No.: 207,740

[52] U.S. Cl............................ 57/71, 57/99, 242/47
[51] Int. Cl. ........................ D01h 7/24, D01h 1/04
[58] Field of Search ................. 242/159, 47; 57/68, 57/69, 70, 71, 99, 102

[56] References Cited
UNITED STATES PATENTS 3,383,851  5/1968  Hickman........................ 242/159 X
3,543,503  12/1970  Watabe et al................... 242/159 X
3,545,192  12/1970  Hickman................................ 57/71
3,508,316  4/1970  Hill........................................ 57/99

*Primary Examiner*—John Petrakes
*Assistant Examiner*—Charles Gorenstein
*Attorney*—Stevens, Davis, Miller & Mosher

[57] ABSTRACT

An apparatus for winding up a cable or the like includes a stationary spool, a cable guiding device positioned about said spool, and means for vertically reciprocating said guiding device while moving it about the axis of said spool.

1 Claim, 1 Drawing Figure

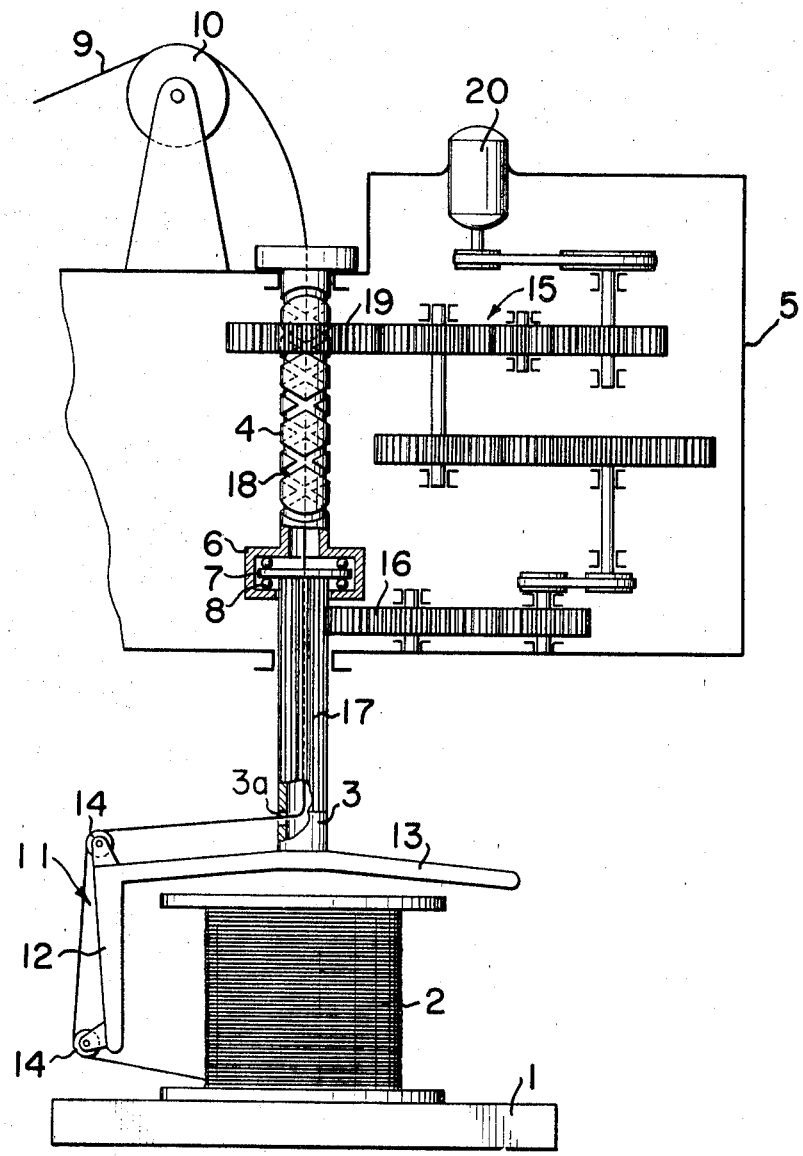

APPARATUS FOR WINDING UP WIRE, STRAND, CABLE OR THE LIKE

This invention relates to an apparatus for winding up wire, strand, cable or the like (hereinafter general'y referred to as "cable") on a spool.

Heretofore, a cable has been would up on a spool by rotating the spool. However, in the case of winding up a cable on a spool by rotating the spool, the weight of the spool being rotated is increased in proportion to the number of turns of the cable on the spool. Therefore, a source of large power is required for surely rotating the spool. Moreover, a device for supporting the spool must have a considerable mechanical strength. For this reason, a winding up apparatus having a predetermined winding up capability does not allow the use of any other spools than a spool of predetermined dimensions. In such a winding up apparatus, any winding up of cable over the predetermined number of turns of cable on the spool, is never allowed.

Therefore, it is an object of this invention to provide a cable winding up apparatus eliminating the above-mentioned disadvantages.

It is a further object of this invention to provide a cable winding up apparatus wherein a cable is wound up on a stationary spool.

The objects of this invention as mentioned above can be achieved by moving a cable guiding device about a stationary spool and vertically reciprocating the guiding device with respect to the spool.

This invention will become more apparent from a consideration of the following detailed description of an embodiment thereof given in connection with the accompanying drawing. In the accompanying drawing, there is schematically shown an apparatus according to this invention, with parts thereof removed.

Referring now to the accompanying drawing, a spool 2 is placed on a base 1 at a standstill. A rotating hollow shaft 3 and a reciprocating hollow shaft 4 are supported by a frame 5 so that they may be in line with the axis of the spool 2. The hollow shaft 4 has an enlarged connecting portion 6 at its lower end, while the rotating hollow shaft 3 has at its upper end a flange 7 which is positioned within the enlarged connecting portion 6. The rotating hollow shaft 3 is connected to the hollow shaft 4 for rotation by interposing a ball bearing 8 between the flange 7 and the enlarged connecting portion 6.

A cable 9 from a cable source is led into the hollow shafts 3 and 4 through a guide roller 10 mounted on the frame 5 and then led out from a side opening 3a formed at a lower portion of the hollow shaft 3. A guiding device 11 includes a supporting member 13 having an arm 12 which is radially spaced apart from the spool 2 and extends downward in parallel to the axis of the spool 2, and guiding elements 14 mounted on said arm 12, said supporting member 13 being secured to the rotating hollow shaft 3 at its lower end. The cable led out from the side opening 3a is led through the periphery of the guiding elements 14 on the spool 2.

The rotating hollow shaft 3 is provided at its periphery with teeth 17 to engage with a terminal gear 16 of a gear train 15. On the other hand, the reciprocating hollow shaft 4 is provided at its periphery with crossed cam grooves 18. Another terminal gear 19 of the gear train 15 is rotatably mounted on the hollow shaft 4 and retained on the hollow shaft 4 by any suitable means to prevent it from moving along the shaft 4. The gear 19 has a ship-like cam (not shown) engaging the crossed cam grooves 18. Thus, a rotational motion by a motor 20 is imparted from motor 20 through the gear train 15 to the terminal gears 16 and 19. The rotation of the gear 19 causes the hollow shaft to be vertically reciprocated by the cooperation of the ship-like cam and the crossed cam grooves 18, while the rotation of the gear 16 is imparted to the hollow shaft 3 through its teeth 17. Thus, the hollow shaft 3 is vertically reciprocated together with the hollow shaft 4 while being rotated. This results in the fact that the guiding elements 14 of the guiding device 11 are vertically reciprocated while being moved about the spool 2. Thus, a cable from the guiding elements 14 can be wound on the spool 2 in a coil.

According to this invention, since a cable is wound on a stationary spool, the permissible number of turns of cable on the spool can be increased. Moreover, the apparatus of this invention is simple in its structure, compared with conventional apparatus of the type in which a spool is rotated. According to this invention, a necessary power can be minimized.

This invention is not limited to the employment of means for rotating and reciprocating a guiding device as illustrated herein. It is recognized that various means occurring to those skilled in the art may be employed.

We claim:

1. An apparatus for winding a cable or the like on a stationary spool comprising first and second hollow shafts having their axes aligned with each other and disposed along the axis of said spool, means for rotationally connecting said second shaft to said first shaft, a cable guiding device disposed adjacent the periphery of said stationary spool and connected to the lower end of said second hollow shaft, said guiding device leading the cable onto said stationary spool, said cable passing through the interiors of said hollow shafts from a cable supply, means for vertically reciprocating said first shaft to move said guiding device along the length of said stationary spool, and driving means for rotating said second shaft to move said guiding device about the axis of said spool, thereby winding said cable through said guiding device on said spool.

* * * * *